Dec. 9, 1969     H. L. DOBRIKIN     3,482,886
TRAILER BRAKE AND RELEASE SYSTEM
Filed Nov. 5, 1968
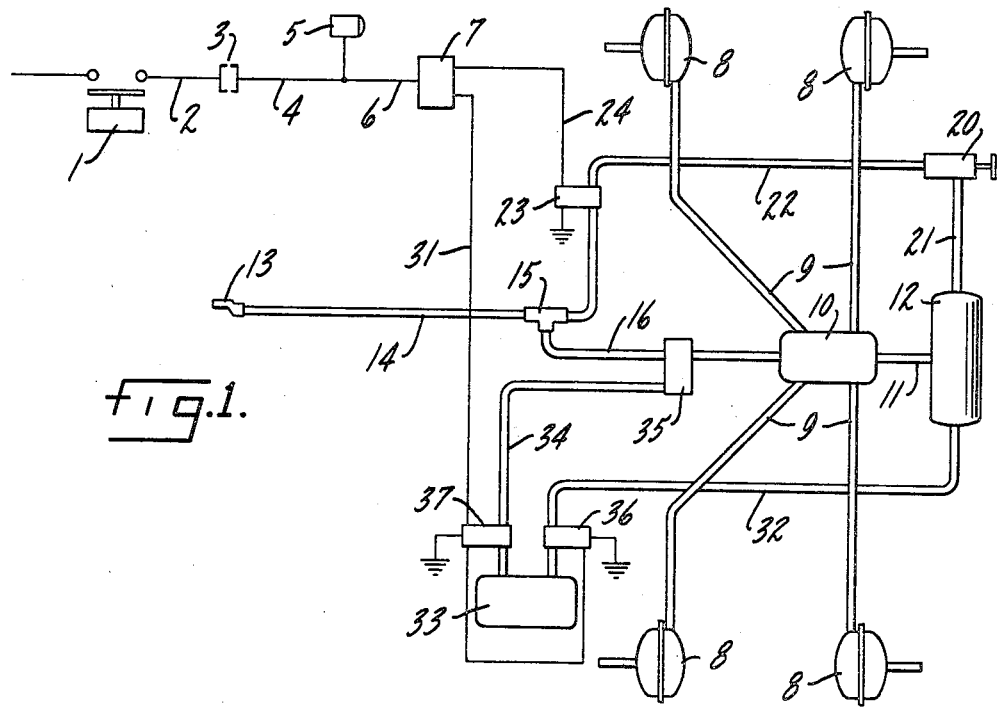
fig.1.
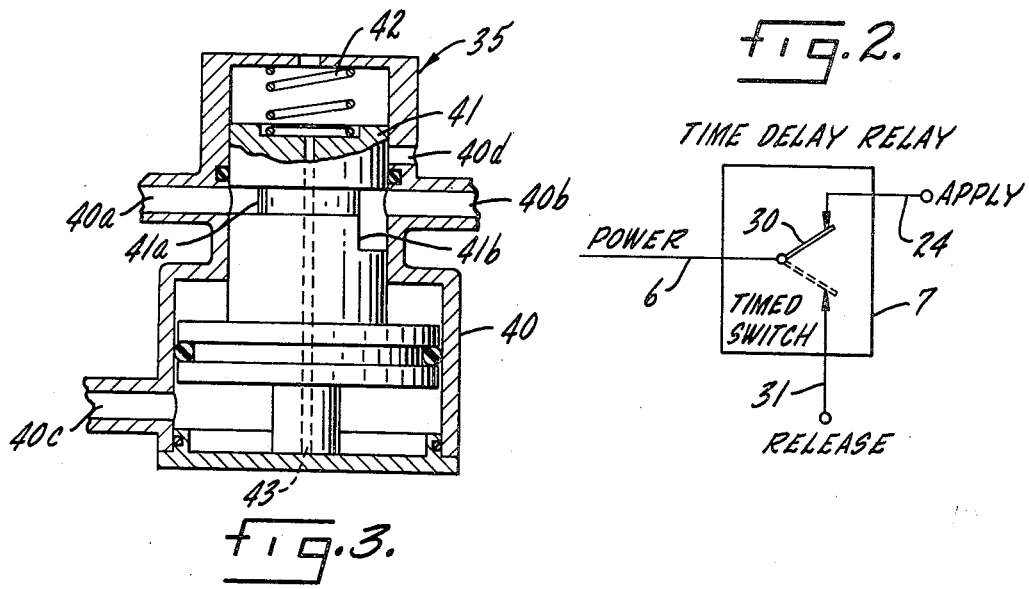
fig.2.
fig.3.
INVENTOR.
Harold L. Dobrikin
BY Parker, Carter & Markey
Attorneys.

United States Patent Office 3,482,886
Patented Dec. 9, 1969

3,482,886
TRAILER BRAKE AND RELEASE SYSTEM
Harold L. Dobrikin, Highland Park, Ill., assignor to Berg Mfg. & Sales Co., Des Plaines, Ill., a corporation of Illinois
Filed Nov. 5, 1968, Ser. No. 773,417
Int. Cl. B60t 13/28, 13/74
U.S. Cl. 303—7                                           4 Claims

ABSTRACT OF THE DISCLOSURE

A system mounted entirely on a trailer and responsive to actuation of the tractor brake system to supply an accelerated initial impulse fluid pressure to the trailer brake system and to charge a pneumatic release system which in turn operates upon release of the tractor brake application to exhaust the trailer system.

SUMMARY OF THE INVENTION

A standard trailer brake system having a service line, a two-way check valve, a relay emergency valve, a trailer-supported tank and conduits feeding pressure through the relay emergency valve to the trailer brake chambers has incorporated therein an additional conduit from the tank to the two-way check valve, a pressure regulating valve in said last-named conduit and an electrically operated valve between the pressure regulating valve and the two-way check valve. A conductor connects the electrically operated valve through a time delay device to the stoplight circuit of the trailer. An air-operated exhaust valve is connected in the conduit between the two-way check valve and the relay emergency valve. A small tank is provided between the trailer tank and the air-operated exhaust valve. Electrically operated valves are incorporated on opposite sides of the small tank. Upon actuation of the tractor brake system and consequent energizing of the stoplight circuit on the trailer, the time delay operates the first-named electrically operated valve for a predetermined period of time to supply fluid pressure to the relay emergency valve and thus to fill the trailer brake system. Energizing the stoplight circuit opens the electrically operated valve between the main tank and the auxiliary tank to fill the latter and closes the electrically-operated valve between the small tank and the air-operated release valve. Upon release of the tractor brake pedal and consequent deactivation of the stoplight circuit, the last-named electrically-operated valve opens to supply a predetermined volume of air pressure to the air-operated release valve to provide rapid exhaust and release of the trailer brakes. At the same time the electrically operated valve between the main tank and the auxiliary tank closes to protect the main tank against loss and to permit the air-operated exhaust valve to bleed down and return to its normal position. Thus is provided a system capable of accelerating both the application and release of the trailer brakes, the system being entirely mountable on a trailer and rendering the trailer usable with any tractor.

This invention relates to tractor-trailer combination vehicles and particularly to the brake systems thereof.

When the vehicle operator actuates the tractor-mounted brake pedal to apply or release the brakes of the combination vehicle, a delay occurs between the application and release of the tractor brakes and the application and release of the trailer brakes, said delays being caused by the necessity of filling and emptying the conduits, valves and elements of the brake systems. The problem is further accentuated in connection with double and triple trailer or "train" type road vehicles. Said delays are productive of shock and strain on the fifth wheels and other connecting elements between the vehicle segments, trailer drag, imbalance and tendencies toward jackknifing and loss of control. Some of the suggested solutions to the problem involve modifications to both the tractor and the trailer. Freedom to employ available tractors with available trailers is both economically and practically important. Hence it is one purpose of the present invention to provide a system for accelerating the application and release of trailer brakes in response to tractor brake application, which system is carried entirely on the trailer.

Another purpose is to provide a means of rapidly applying and releasing trailer brakes, the system being responsive respectively to energizing and de-energizing of the trailer stoplight circuit.

Another purpose is to provide a means effective to exhaust the trailer brake system in response to de-energizing of the trailer stoplight circuit.

Another purpose is to provide an electrically-applied, pneumatically exhausted trailer brake system.

Another purpose is to provide a fail-safe system effective to accelerate the application and release of trailer brakes.

Another purpose is to provide a trailer-mounted system for electrically filling the fluid pressure brake system of the trailer and electrically establishing a pneumatic system effective upon loss of electrical power to the system to empty said fluid pressure system.

Other purposes may appear from time to time during the course of the specification and claims.

BRIEF DESCRIPTION OF THE DRAWINGS

The invention is illustrated more or less diagrammatically in the accompanying drawings wherein:

FIGURE 1 is a schematic illustration of the system of the invention;

FIGURE 2 is a schematic representation of a time delay device usable with the system of the invention; and FIGURE 3 is a cross-sectional view of a valve usable with the system.

Like parts are indicated by like numerals throughout the specification and drawings.

BRIEF DESCRIPTION OF THE DISCLOSURE

Referring now to the drawings, and particularly to FIGURE 1, the numeral 1 generally designates an air pressure operable stoplight switch which, as is well known, responds to delivery of fluid pressure from the tractor brake application valve (not shown) to supply electrical energy through the conductor 2, tractor-trailer connection 3 and conductor 4 to the trailer stoplights represented by the light 5. Thus, each time the vehicle operator presses the brake pedal (not shown) downwardly on the tractor to apply the vehicle brakes, electrical energy will be supplied to the lights repreesnted by light 5 and to the stoplight circuit of the trailer.

A conductor 6 connects to the stoplight circuit of the trailer a time delay switch or device 7. As is well known, the trailer brake system includes a trailer brake actuating chamber 8 for each of the tractor brakes, the actuators 8 being shown as four in number herein. Each of the actuators 8 is connected as by conduits 9 to a relay emergency valve 10. The emergency valve 10 is supplied with fluid pressure, as by conduit 11, from the trailer-mounted fluid pressure reservoir or tank 12.

A gladhand connector 13, as is well known, connects the service fluid pressure line of the tractor to a conduit 14, a two-way check valve 15 and conduit 16 to the service side of the service piston (not shown) in the relay emergency valve 10. Thus, under normal operation, the actuation of the brake pedal and application valve on the tractor by the vehicle operator delivers fluid pressure to the tractor brakes and also to connector 13 and, through elements 13–16, to the service piston of the relay emergency valve 10. Thereupon the relay emergency valve 10 will be opened to deliver fluid pressure from the tank 12 through elements 11, 10, 9 to the actuators 8 to apply the trailer brakes. The described sequence thus entails substantial delay between actuation of the tractor brakes and the trailer brakes.

In the system of the present invention a regulator valve 20 communicates, through a suitable conduit 21, with the tank 12 and through a conduit 22 with the two-way check valve 15. The regulator valve 20 is designed to supply a predetermined level of pressure to the two-way check valve 15. Located in the conduit 22 is an electrically operated valve 23 connected, as by conductor 24, with the time delay device 7. Thus, upon movement of the tractor brake pedal toward brakes-on position and consequent energizing of the stoplight circuit, the time delay device 7 will deliver for a predetermined duration, electrical energy to valve 23 to open it and allow fluid pressure to flow from tank 12 through elements 20, 22, 15 and 16 to the relay emergency valve 10 and thus to provide initial filling of the elements 11, 10, 9 and 8, virtually simultaneously with or prior to the application of tractor brakes.

As schematically illustrated in FIGURE 2, the time delay device 7 has a normally closed switch 30, closed to supply electrical energy through conduit 24 upon energizing of the stoplight circuit represented by the light 5 and conductor 6. The switch 7 is timed and arranged in known manner to provide such delivery of electrical energy to conductor 24 and valve 23 for a predetermined short period of time. It has been found effective, for example, to supply such energy for a period in the other of a quarter second. Thereafter the switch 30 will move into contact with a conductor 31.

A conduit 32 communicates the tank 12 with an auxiliary tank 33 normally of predetermined smaller capacity than that of the tank 12. Conduit 34 communicates the tank 33 with an air-operated release or exhaust valve 35. Connected in the conduit 32 between tanks 12 and 33 is an electrically operated, normally closed valve 36. Connected in conduit 34 between tank 33 and valve 35 is an electrically operated, normally open valve 37. Valves 36 and 37 are connected to conductor 31 for simultaneous supply of electrical energy to valves 36, 37 in response to energizing of the stoplight circuit represented by light 5 and conductor 6. The time delay device 7 provides for supply of electrical energy to the valves 36, 37 without excess load upon the stoplight circuit, though it will be understood that valves 36 and 37 could be otherwise connected to the stoplight circuit.

Referring now to FIGURE 3, a suitable valve 35 is illustrated. It will be realized that the valve 35 could take a variety of forms. As illustrated in FIGURE 3, however, the valve 35 includes a housing 40 having reciprocal therein a valve piston 41. Yielding means 42 urges the valve piston 41 toward the normal position shown. In said position a reduced area 41a of valve piston 41 is aligned with the openings 40a, 40b connected to conduit 16 to provide for free flow of fluid pressure in either direction therethrough. Upon delivery of fluid pressure from conduit 34 to housing inlet 40c at one side of piston 41, the piston 41 will move against the action of spring 42 to align the expanded recess 41b with the opening 40b and the exhaust outlet 40d of housing 40 to exhaust the portion of conduit 16 between valve 35 and relay emergency valve 10 and thus to exhaust the area above the service piston in relay emergency valve 10, resulting in the release of pressure from the actuators 8 and consequent release of the trailer brakes. At the same time, piston 41 will close off opening 40a and thus protect the upstream portion of conduit 16 and the elements communicating therewith from loss of fluid pressure.

Indicated at dotted lines at 43 is a vent or bleed hole enabling the fluid pressure delivered at inlet 40c to housing 40 to bleed down or bleed off and thus to enable the means 42 to return the valve piston 41 to the normal position shown in FIGURE 3. It will be understood that the volume and capacity of tank 33, the effective area of piston 41 and bleed opening 43, as well as the force of spring 42, are correlated and balanced to provide for a predetermined period of operation of the piston 41.

In operation, movement of the tractor brake pedal results in actuation of the brake application valve and switch 1 to supply electrical energy for illumination of the stoplights represented by the light 5. Consequent energizing of the stoplight circuit delivers energy to the time delay switch or device 7, which in turn delivers, over a predetermined period, electrical energy through conductor 24 to valve 23. Thereupon a predetermined volume of air and pressure is delivered through conduit 22, valve 15 and conduit 16 to relay emergency valve 10 to open the same for filling of the trailer brake pressure system from the tank 12. Virtually immediately thereupon, electrical energy is delivered from device 7 to valves 36 and 37. Delivery of electrical energy to normally closed valve 36, opens the same to supply a predetermined volume of air and pressure to tank 33. At the same time, the normally opened valve 37 is closed to preclude escape of fluid pressure from tank 33.

Upon release of the brake pedal by the vehicle operator, switch 1 opens and de-energizes the stoplight circuit, resulting in loss of electrical power to the device 7 and thus to the valves 36 and 37. Thereupon the normally closed valve 36 closes to protect the tank 12 against loss of fluid pressure and to preclude any continuing delivery of fluid pressure into and through the tank 33. Simultaneously, the normally open valve 37, being now deprived of electrical energy, returns to its normal, open position and a predetermined volume and level of air pressure is delivered through conduit 34 to release valve 35 to move it into exhaust position. Thereupon the area above the service piston in the relay valve 10 will be exhausted through the valve 35 to atmosphere and the trailer brakes will be released. Bleed means 43 enables valve 35 to return to its normal position in which conduit 16 remains open in both directions. The electrically operated valves 23, 36 and 37 also have a normal position maintaining their associated conduits in normal unaffected status. Hence a failure of electrical energy produces no affect upon the normal brake system of the tractor or trailer.

While one valve 35 is shown in the service line 16, it will be understood that one of the valves 35 could be placed in each of the conduits communicating relay valve 10 with brake chambers 8.

The embodiments of the invention in which an exclusive property or privilege is claimed are defined as follows:

1. For use with a trailer having a stoplight circuit, a pressure reservoir, a relay emergency valve, brake actuators and a service line to said emergency valve, a conduit communicating said reservoir with said service line, an electrically operated valve in said conduit, said valve being connected to said circuit and openable in response to energizing of said circuit to supply fluid pressure from said reservoir to said relay emergency valve, an auxiliary reservoir on said trailer, an air operated exhaust valve connected to said service line, a second conduit connecting said reservoir with said auxiliary reservoir, a third conduit connecting said auxiliary reservoir with said air operated valve, an electrically operated, normally closed valve in said second conduit, an electrically operated, normally open valve in said third conduit, said last-named electrically operated valves being connected to said circuit whereby said normally closed valve is opened in response to energizing of said circuit to supply fluid pressure from said reservoir to said auxiliary reservoir, said normally open valve is closed in response to energizing of said circuit to protect said auxiliary reservoir against loss of fluid pressure therefrom, said normally closed valve being openable in response to de-energizing of said circuit to supply fluid pressure from said auxiliary reservoir to said air operated exhaust valve to exhaust said service line and relay emergency valve to release said brakes, said normally closed valve being closed in response to de-energizing of said circuit to close said reservoir against loss of fluid pressure to said auxiliary reservoir.

2. A trailer brake release system including a first source of fluid pressure, a second source of fluid pressure, a fluid pressure operated exhaust valve, an electrically operated, normally closed valve controlling communication between said first and second sources, an electrically operated normally open valve controlling communication between said second source and said exhaust valve, and a source of electrical energy.

3. For use with a trailer brake system having a stoplight circuit, a main fluid pressure tank and a plurality of brake actuators, air-operated exhaust valve means having a first position permitting communication between said main tank and said actuators, and a second position permitting exhaust of said actuators, an auxiliary fluid pressure tank, a normally closed electrically openable valve controlling communication between said main and auxiliary tanks and a normally open, electrically closable valve controlling communication between said auxiliary tank and said air operated valve means, said electrically openable and closable valves being connected to said stoplight circuit.

4. The structure of claim 3 wherein said air-operated valve means includes yielding means and bleed means effective to return said valve means to said first position in response to diminution of fluid pressure through said bleed means.

References Cited

UNITED STATES PATENTS

| | | | |
|---|---|---|---|
| 2,169,668 | 8/1939 | Thomas | 188—3 |
| 2,571,885 | 10/1951 | Ingres | 303—8 |
| 3,232,674 | 2/1966 | Stelzer | 303—7 |

MILTON BUCHLER, Primary Examiner

J. J. McLAUGHLIN, Jr., Assistant Examiner

U.S. Cl. X.R.

188—3; 303—3, 15, 20, 28, 68